(12) United States Patent
Moon et al.

(10) Patent No.: US 7,687,104 B2
(45) Date of Patent: Mar. 30, 2010

(54) METHOD OF APPLYING ASPHALT WATERPROOFING MEMBRANE MATERIAL FOR BUILDINGS AND BRIDGE DECKS

(75) Inventors: Young Gyu Moon, Seongnam-si (KR); Du Byung Kim, Imsil-gun (KR)

(73) Assignees: Road Seal Co., Ltd., Jeonbuk (KR); Hwashin Co., Ltd., Jeonbuk (KR)

( * ) Notice: Subject to any disclaimer, the term of this patent is extended or adjusted under 35 U.S.C. 154(b) by 174 days.

(21) Appl. No.: 11/719,933

(22) PCT Filed: Sep. 7, 2006

(86) PCT No.: PCT/KR2006/003557

§ 371 (c)(1),
(2), (4) Date: May 22, 2007

(87) PCT Pub. No.: WO2007/061173

PCT Pub. Date: May 31, 2007

(65) Prior Publication Data

US 2009/0165923 A1     Jul. 2, 2009

(30) Foreign Application Priority Data

Nov. 23, 2005    (KR) .................. 10-2005-0112469

(51) Int. Cl.
*B05D 5/10* (2006.01)
*E01C 7/00* (2006.01)
*E01C 3/00* (2006.01)
*E01C 23/14* (2006.01)

(52) U.S. Cl. ............... 427/136; 427/138; 404/17; 404/27; 404/31; 404/72; 404/79

(58) Field of Classification Search ........... 427/136, 427/138; 404/17, 27, 31, 66, 72, 75, 77, 404/82
See application file for complete search history.

(56) References Cited

U.S. PATENT DOCUMENTS

| | | | | |
|---|---|---|---|---|
| 2,348,320 A * | 5/1944 | Becker | ............ | 405/265 |
| 2,771,745 A * | 11/1956 | Bramble | ............ | 405/270 |
| 4,485,201 A | 11/1984 | Davis | | |
| 4,952,268 A | 8/1990 | Beck et al. | | |
| 6,158,920 A * | 12/2000 | Malot | ............ | 404/27 |
| 2004/0081789 A1 | 4/2004 | Kim | | |
| 2004/0120765 A1* | 6/2004 | Jones et al. | ............ | 404/35 |

(Continued)

FOREIGN PATENT DOCUMENTS

JP    57098559    6/1982

(Continued)

OTHER PUBLICATIONS

International Search Report of the Austrian International Searching Authority dated Jan. 4, 2007 for International Application No. PCT/KR06/003557; Applicant, Road Seal Co., Ltd.

(Continued)

*Primary Examiner*—Michael Cleveland
*Assistant Examiner*—Michael Wieczorek
(74) *Attorney, Agent, or Firm*—Holme Roberts & Owen LLP

(57) ABSTRACT

Disclosed herein are a method of applying an asphalt waterproofing membrane material for buildings and bridge decks using sawdust. More specifically, disclosed is a method for applying a waterproofing membrane composition having excellent waterproofing ability using sawdust, such that the composition is not broken down by external force and can function as a waterproofing material.

9 Claims, 1 Drawing Sheet

| FOREIGN PATENT DOCUMENTS | | |
|---|---|---|
| JP | 57139143 | 8/1982 |
| JP | 57139146 | 8/1982 |
| KR | 1020010107074 | 7/2001 |
| KR | 20010107074 * | 12/2001 |
| KR | 20020031225 | 5/2002 |
| KR | 1020020031225 | 5/2002 |
| KR | 20040044627 | 5/2004 |
| KR | 1020040044627 | 5/2004 |
| KR | 20040108406 | 12/2004 |
| KR | 1020040108406 | 12/2004 |
| KR | 100473730 B | 2/2005 |

OTHER PUBLICATIONS

Written Opinion of the Austrian International Searching Authority dated Jan. 4, 2007 for International Application No. PCT/KR06/003557; Applicant, Road Seal Co., Ltd.

* cited by examiner

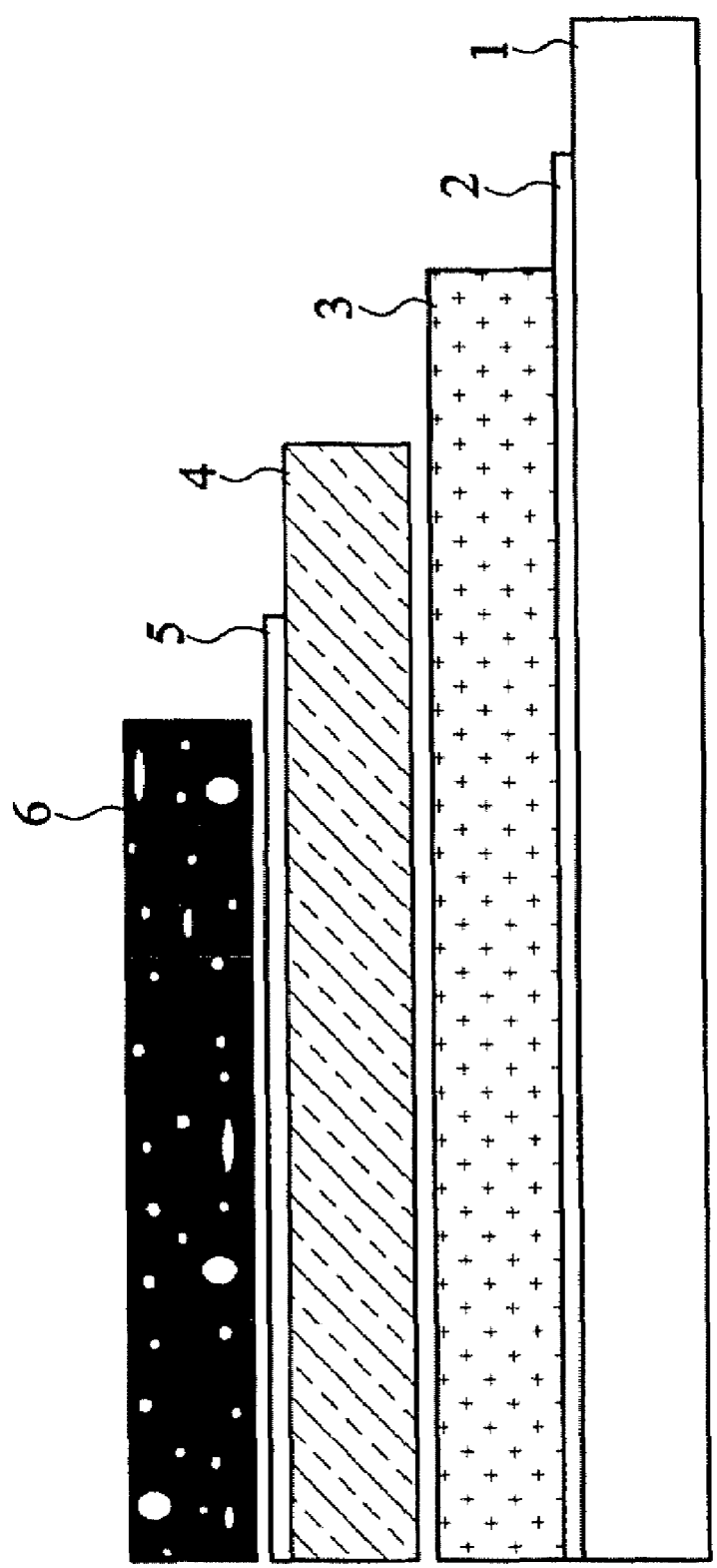
[Fig. 1]

METHOD OF APPLYING ASPHALT WATERPROOFING MEMBRANE MATERIAL FOR BUILDINGS AND BRIDGE DECKS

CROSS-REFERENCE TO RELATED APPLICATIONS

This application is a 371(c) National Stage of PCT/KR2006/003557 filed Sep. 7, 2006, which claims priority to Korean patent application Ser. No. 10-2005-0112469 filed Nov. 23, 2005, the disclosures of which are hereby incorporated by reference in their entireties.

TECHNICAL FIELD

The present invention relates to a method of applying an asphalt waterproofing membrane material for buildings and bridge decks, and more particularly to a method for applying a waterproofing membrane composition, which is suitable as a waterproofing material and has excellent waterproof ability, using sawdust, such that the waterproofing membrane composition is not broken down by external forces and can function as a waterproofing material.

BACKGROUND ART

Generally, the penetration of rain water or underground water into buildings or bridge decks reduces the bonding force of concrete material, causes pores and cracks due to the change in water volume caused by temperature change, and enlarges the cracks with the passage of time, resulting in a reduction in the strength and life span of structures forming the bridge decks.

Particularly in the case of bridge decks, as vehicles pass thereon, the deck slab thereof bends due to self-load and impact, and vibrations can occur, causing fine cracks in the pavement layer and thus separating the pavement layer from the bridge deck, such that rainwater or condensation water can infiltrate the deck slab to accelerate the cracking of the deck slab and corrode a structure or steel bars in the structure, causing the risk of a reduction in the life span and breakdown of the structure.

For this reason, a waterproofing material is required, and must have the capability to achieve the complete waterproofing of buildings and bridge decks and to absorb load and impact so as to inhibit the enlargement of cracks in the structure.

Meanwhile, for the complete waterproofing of buildings and bridge decks, various materials, including modified asphalt and rubber, are used. These materials must have various physical properties depending on the intended use thereof, and thus an improvement in the physical properties thereof is required in various fields.

For example, Japanese Patent Laid-Open Publication No. Sho 57-98559 discloses an asphalt which contains aromatic and/or naphthenic oil (or mineral oil) and thermoplastic rubber as additives for asphalt modification. The mineral oil has the effect of plasticizing the asphalt, and the thermoplastic rubber increases the softening point of the asphalt and makes the asphalt tough, but there is a problem in that a large amount of rubber is required in the asphalt in order to increase mechanical strengths, such as compression strength and tensile strength, and restoration ability to an original state thereof.

Japanese Patent Laid-Open Publication No. 57-139143 discloses a composition which contains a bitumiinous material (i.e., asphalt), a block copolymer (SBS, SIS or SEBS) of conjugated diene with vinyl aromatic hydrocarbon), a stabilizer containing nitrogen and sulfur atoms in the molecule, other various stabilizers, and a radical polymerization inhibitor.

Also, U.S. Pat. No. 4,485,201 discloses a method of producing an asphalt composition by preparing a blend of asphalt, ground rubber and a styrene-butadiene block copolymer and mixing the blend with a heat-resistant antioxidant, a tackifying agent, and process oil as a plasticizer or a softening agent, at a temperature of 149~204° C.

According to the disclosure of said US patent, the composition exhibits good cohesion and adhesion at high temperatures, good flexibility at high and low temperatures, and excellent elasticity, and can be used as a crack sealer, a concrete joint sealer filler and an overlay sealant for construction materials.

However, this composition has a cone penetration of 60 and a flow of 20 mm at a softening point of 60° C. Thus, it has problems in that, when it is used as a waterproofing material for building roofs or as a crack-repairing material for road pavement in the summer season, it will undergo flow and plastic deformation, and when it is used as a road-repairing material, it will stain vehicle tires or the shoes of pedestrians.

Generally, in the summer season in Korea, the surface temperature of roads and roofs can increase to 60° C. or higher, but this temperature varies depending on the material and color of the surface. To overcome this shortcoming, organic fillers, including stone, aggregate, calcium carbonate, silica and talc, are frequently used, which increase the hardness, penetration value, softening point and the like, but decrease elongation and adhesive properties.

For example, a concrete pavement road sometimes consists only of concrete, but may also consist of an asphalt layer applied on a concrete layer in order to increase riding comfort and provide a waterproof effect. Particularly, in the case of bridges constructed with steel bars and concrete, the surface of the deck slab thereof is paved with asphalt, such that the deck slab surface is maintained in the same state as a road surface, and water is prevented from infiltrating into the concrete material.

In addition, in order to prevent the corrosion of both a concrete material, forming bridges, and steel bars, inserted into the concrete material, the infiltration of water is inhibited using various processes such as penetrating waterproofing, sheet waterproofing and membrane waterproofing. Nevertheless, water infiltrates the deck slab or pier of a bridge, thus reducing the life span of the bridge.

Due to the behavior of bridges or the traffic load applied to the bridge deck slab, the corrosion (cracking) of the bridge accelerates. In addition to this, due to the repeated freezing and thawing of water introduced into the corroded bridge, or due to the infiltration of chloride sprinkled to thaw the bridge deck slab, vertical or horizontal deformation and cracks in the deck slab (paved surface of the bridge) occur.

Korean Patent No. 0337443 discloses a composite waterproofing material for constructions such as buildings or bridges, which comprises a membrane material comprising 64% asphalt, 11% SBS thermoplastic rubber, 8% additive and 2~8% filler, and a nonwoven fabric sheet having a molten coating material applied on the lower surface thereof such that the sheet is adhered to a membrane formed by the membrane material in order to protect the membrane. However, in said waterproofing material, there can be problems with respect to adhesion to the base of structures and a decrease in the adhesion thereof in response to temperature change. Also, it has low thermal resistance, resulting in damage to the waterproofing layer at high temperatures in the summer season.

Korean Patent No. 0377431 discloses a process of waterproofing the deck of a concrete bridge using a Guss material and a glassfiber mesh when paving the deck with asphalt. However, a waterproofing layer constructed using the process of said patent has problems with respect to crack bridging and low-temperature flexibility.

Korean Patent No. 0473730 discloses a method of waterproofing a concrete structure, comprising a first step of smoothing the surface of the concrete structure, a second step of coating an adhesive primer on the concrete structure surface, a third step of attaching a polymer resin-coated waterproof sheet onto the primer layer, and a fourth step of coating a urea polymer resin on the waterproof sheet, said waterproof sheet having a hardness of 40~60 as measured by a Shore A-type hardness tester, and said urea polymer resin layer having a hardness of more than 90.

Korean Patent No. 0519459 discloses a material in which carbon fiber and glass fiber cross each other at a given interval in the form of a grid, and nonwoven fabric is attached to one surface of the grid consisting of carbon fiber and glass fiber, as well as a method for the reinforcement, waterproofing and snow-melting of a paved road using said material.

Korean Patent No. 0496627 discloses a composite waterproof layer formed by forming a sheet layer having a reinforced composite structure consisting of reinforced nowonven fabric, a thermoplastic synthetic polymer sheet, glass fiber and/or a film layer and then laminating a waterproof membrane layer on the nonwoven fabric bonded on the sheet layer, as well as a method for applying said reinforced composite layer using either an adhering method allowing partial insulation or an adhering method for additionally forming an adhered portion inside a corner.

However, the sheet layer for protecting the waterproofing material suggested in the prior art cannot ensure realization of a waterproofing material that is not broken by external force and has excellent physical properties.

DISCLOSURE OF INVENTION

Technical Problem

Accordingly, the present inventors have developed a heating-type asphalt waterproofing membrane composition having excellent crack-bridging capability, low-temperature flexibility, heat resistance, adhesion, and temperature sensitivity, and a method for applying the waterproofing membrane composition, which ensures the excellent physical properties of the waterproofing membrane composition layer by protecting the composition layer. On the basis of this, the present invention has been completed.

Therefore, it is an object of the present invention to provide a method for applying a waterproofing membrane material, which can fundamentally solve the problems with the prior waterproofing materials by protecting a waterproof layer from external forces and integrating a pavement layer with the waterproof layer, can be conveniently applied, has excellent durability, and can ensure excellent physical properties for use as a waterproofing material for buildings and bridge decks.

Technical Solution

To achieve the above object, the present invention provides a method for applying an asphalt waterproofing membrane material for buildings and bride decks, which comprises the steps of: removing foreign matter from a base, paving a base coating on the base to obtain a smooth surface and curing the obtained surface; uniformly paving a heating-type asphalt waterproofing membrane composition on the cured surface and indirectly heating the paved composition at a temperature of 180~200° C.; applying sawdust on the composition before the composition is cured; and paving a top coating (primer tack coating) on the sawdust to increase the adhesion of the sawdust to a pavement layer to be subsequently formed, curing the paved top coating, and then paving an asphalt or concrete pavement material on the cured top coating.

BRIEF DESCRIPTION OF THE DRAWINGS

FIG. 1 is a partial perspective view schematically showing a waterproofing structure according to a preferred embodiment of the present invention.

BEST MODE FOR CARRYING OUT THE INVENTION

Hereinafter, the present invention will be described in further detail.

As described above, a method for applying an asphalt waterproofing membrane material for buildings and bridge decks according to the present invention is characterized in that the waterproofing membrane material is applied using sawdust. Thus, the waterproofing composition has an excellent ability to bridge fine cracks in the structures, accommodates the behavior of the structures caused by temperature change, has excellent adhesion to a base and excellent waterproofing effects, and can be protected from external force.

Referring to FIG. 1, foreign material is removed from a base 1 to be waterproofed, and a base coating is paved on the base 1 to obtain a smooth surface and is cured, thus forming a base coating layer 2. Then, to form a membrane layer 3, the heating-type asphalt waterproofing membrane composition according to the present invention is uniformly paved on the base coating layer 2 to a thickness of 1~5 mm, and preferably 2~4 mm, and is indirectly heated at 180~200° C.

Also, before the composition is cured, sawdust is paved on the composition to a thickness of 0.5~4 mm, and preferably 1~2 mm, thus forming a sawdust layer 4. To increase the adhesion of the sawdust layer 4 to a pavement layer to be subsequently formed, a top coating (primer tack coating) is paved on the sawdust layer, thus forming a top coating layer 5. Then, an asphalt or concrete pavement material 6 is paved on the top coating layer 5.

More specifically, foreign matter, such as earth and dust, is completely removed from the base 1, which is to be waterproofed in waterproofing construction, and the base 1 is maintained at a dry state. Then, the base coating is applied on the base 1 in an amount of about 0.2~0.3 liters per $m^2$ to smooth the surface of the base.

Also, after the foreign matter has been removed from the base 1, the cracked portion of the base 1 is filled with the heating-type asphalt waterproofing membrane composition. Also, to increase the adhesion between the pavement layer and the protective layer (sawdust layer), the top coating (primer tack coating) is applied on the protective layer in an amount of about 0.2~0.3 liters per $m^2$.

In the present invention, if the thickness of the sawdust is less than 0.5 mm, the asphalt waterproofing membrane layer will be damaged by the pavement layer and paving equipment, and if it exceeds 4 mm, the integration of the pavement layer with the asphalt waterproofing membrane layer will not be realized, and separation of the bridge deck from the pavement layer will occur due to shear stress occurring in the pavement layer.

The sawdust, used in the present invention, can be obtained either by collecting waste wood generated in building and construction sites and grinding the collected waste wood to a size of 10~20 mm$^2$, or by collecting sawdust generated in wood processing factories, sieving the collected sawdust through a 10-mm size sieve and recovering the sawdust portion remaining on the sieve. After the asphalt membrane layer is paved, but before it is cured, the sawdust layer is formed on the membrane layer, such that the membrane layer is hidden. If the size of the sawdust is less than 10 mm$^2$, the sawdust will not protect the asphalt waterproofing membrane layer, because it will be absorbed into the asphalt waterproofing membrane layer due to its small size, before the waterproofing membrane layer is cured. On the other hand, if it exceeds 20 mm$^2$, the protective layer protecting the waterproofing membrane layer becomes thick, and thus separation of the waterproofing membrane layer from the pavement layer will occur due to shear stress occurring in the pavement layer.

In the present invention, the use of sawdust is effective in realizing the integration of the waterproofing layer with the pavement layer and provides, among other benefits, excellent tensile adhesion strength and shear adhesion strength. In addition, it can reduce construction costs, and also environmental cost due to the recycling of waste sawdust.

In the present invention, the heating-type asphalt waterproofing membrane material is preferably a mixture of asphalt, a styrenic block copolymer, paraffinic viscoelastic synthetic oil, inorganic filler and other additives. It provides a composite waterproofing material, which has excellent waterproof ability and adhesion and can extend the life span of buildings and decks by achieving integration between the pavement layer, the waterproofing layer and the structures.

In the present invention, asphalt contained in the heating-type asphalt waterproofing membrane material forming a preferred composite waterproofing material preferably has a softening point of 30-100° C. and a penetration of 30~175 dmm in order to be compatible with asphalt concrete (ascon) and thus increase adhesion. More preferably, it has a softening point of 50~70° C. and a penetration of 50~90 dmm.

Said asphalt is preferably used in the waterproofing composition in an amount of 20~70 wt %. If the content of the asphalt is less than 20 wt %, it will result in poor adhesion of the composition, and if it exceeds 70 wt %, it will increase the strength and adhesion of the composition, but it will increase low-temperature brittleness and reduce elasticity, thus deteriorating heat resistance.

The heating-type asphalt waterproofing membrane composition also contains a styrenic block copolymer in order to increase the elasticity and heat resistance thereof. The styrenic block copolymer acts to increase the elasticity and heat resistance of the waterproofing material by increasing the interfacial adhesion between asphalt and waste tire rubber powder, and this increase in elasticity and heat resistance can lead to significant reductions in high-temperature deformation and in the occurrence of cracks and damages caused by external impact.

The content of the styrenic block copolymer in said composition is preferably 1~30 wt %. If the content of the styrenic block copolymer is less than 1 wt %, the elasticity and heat resistance of the composition will not be substantially improved, and if it exceeds 30 wt %, it will result in a reduction in adhesion of the composition and an increase in viscosity.

According to the present invention, the styrenic block copolymer is completely dispersed in the asphalt matrix by high-speed mixing using a high-shear mixer at a high temperature of 150~200° C. to form a network structure having a distinctive shape. Although an increase in the content of the styrenic block copolymer leads to an increase in the elasticity and mechanical strength of the composition, the styrenic block copolymer is preferably used in an amount of 1~15 wt %, because it is expensive compared to asphalt.

Meanwhile, the composition is preferably in the form of powder, which has an advantage of having a short dissolution time.

An asphalt waterproofing membrane composition according to the prior art contains, as a plasticizer or softening agent, bunker-C oil, dioctylphthalate (DOP), tricresyl phosphate (TCP), paraffinic process oil, aromatic process oil or naphthenic process oil.

Said bunker-C oil, dioctylphthalate (DOP) or tricresyl phosphate (TCP) is unsuitable for application to a sealant composition for the protection of vehicle detectors, because it has reduced low-temperature properties and heat resistance. Also, said aromatic and naphthenic process oils have excellent low-temperature properties, but has a very low viscosity index at a given temperature, leading to a reduction in temperature sensitivity, and the paraffinic process oil has a high viscosity index at a given temperature, leading to excellent heat resistance, but has a disadvantage of reduced low-temperature properties.

Generally, when process oil is slowly cooled from a high temperature to a low temperature, it starts to lose its fluidity and reaches a non-flowing state, the reason for which can be divided into two categories as follows.

First, as temperature decreases, the viscosity of process oil slowly increases, such that the process oil does not appear to flow. It is impossible to lower the pour point of the process oil without resorting to the addition of additives. To improve this problem, it is important to select paraffinic oil, which has relatively low wax content and thus good low-temperature flow properties.

Second, the main component of process oil is a mixture of hydrocarbons. Thus, when the process oil is cooled, water contained in the process oil is extracted while freezing the oil at about 0° C., and when the process oil is further cooled, high-pour-point substances contained in the process oil are extracted, such that the process oil becomes hazy. When the cooled process oil continues to cool, the extracted wax grows, so that the process oil is hardened in the form of a network or sponge. To prevent this phenomenon, additives can be added to realize paraffinic oil having a low pour point.

Thus, in the present invention, paraffinic viscoelastic synthetic oil is used in place of the above-described prior plasticizer or softening agent. The paraffinic viscoelastic synthetic oil is synthetic oil obtained by mixing 70~80 wt % of hydrotreated lube base oil, or a mixture of hydrotreated lube base oils having various properties, with 20~30 wt % of additives consisting of a pour point depressant and a viscosity index improver. The paraffinic viscoelastic synthetic oil has a pour point of −60° C., a viscosity index of 200 cp at 25° C., and a flash point higher than 250° C.

If the hydrotreated lube base oil or the mixture of hydrotreated lube base oils is used in the viscoelastic synthetic oil in an amount of less than 70 wt %, it will lead to an increase in viscosity index at a given temperature, and thus an increase in the heat resistance of the heating-type asphalt waterproofing membrane material, but will reduce low-temperature flexibility. On the other hand, if exceeds 80 wt %, it will lead to a great increase in viscosity index at a given temperature, and thus a decrease in the temperature sensitivity of the waterproofing membrane material.

Also, the mixing ratio between the pour point depressant and the viscosity index improver can vary within a range that satisfies the properties of the resulting synthetic oil, i.e., a pour point of −60° C., a viscosity index of 200 cp at 25° C., and a flash point higher than 250° C.

As the pour point depressant in the present invention, a condensation product of chlorinated paraffin and naphthalene, a condensation product of chlorinated paraffin and phenol, polyalkylmethacrylate, a condensation product of phenol and paraffin and/or a condensation product of paraffin and phthalic acid is preferably used.

The viscosity of said organic substances sensitively changes depending on the change in temperature. Generally, the viscosity of organic substances decreases at low temperatures and increases at high temperatures. To improve and complement this property, the viscosity index improver is added for the purpose of reducing the change in viscosity with a change in temperature.

The viscosity index improver, used in the present invention, is a polymeric compound having a molecular weight between 50,000 and 150,000. This polymeric compound shows an increase in its volume with an increase in temperature to prevent an excessive decrease in the viscosity of the composition. Conversely, with a decrease in temperature, it shows a decrease in its volume to prevent a rapid increase in the viscosity of the composition.

In other words, when the polymeric compound as the viscosity index improver is improved in the process oil, the polymer in the oil becomes like a ball of string at low temperatures, leading to a decrease in its volume, so that it has reduced tackifying action. However, as the temperature increases, the string ball-like polymer shows a decrease in its cohesion and is dispersed in the process oil, so that it has increased tackifying action and thus increased viscosity. The viscosity index improver, used in the present invention, can prevent a rapid change in the viscosity of the waterproofing composition at temperatures ranging from −60° C. to 100° C.

As the viscosity index improver, poly-iso-butylene, an olefin copolymer, an ethylene-propylene copolymer, a styrene-butadiene copolymer, a styrene-maleic acid-ester copolymer and/or poly-methacrylate is preferably used.

When the paraffinic viscoelastic synthetic oil is added to the heating-type asphalt waterproofing membrane composition according to the present invention, it will increase the penetration of the composition, and the waterproofing layer formed of the composition will maintain its adhesion at room temperature and its flexibility at low temperatures in the winter season.

The content of the paraffinic viscoelastic synthetic oil in the heating-type asphalt waterproofing membrane composition according to the present invention is preferably 0.5~30 wt %. If it is added in an amount of less than 0.5 wt %, it will have little or no effect, and if it exceeds 30 wt %, it will have severe plasticity, and thus tend to oxidize an ascon or concrete surface to which the composition is adhered.

Meanwhile, in the present invention, the above-described prior plasticizer or softening agent may also be further added in an amount of 0.5~30 wt % in order to increase the low-temperature flexibility and adhesion of the heating-type asphalt waterproofing membrane composition according to the present invention and to reduce the viscosity of the composition.

In the present invention, the heating-type asphalt waterproofing membrane composition must have increased softening and elasticity in order to prevent its permanent deformation at high temperatures and crack occurrence at low temperatures.

Thus, the heating-type asphalt waterproofing membrane composition according to the present invention contains waste tire rubber powder in order to increase the softening point thereof. Due to the increase in the softening point of the composition, the composition does not show viscous flow properties even at a significantly increased temperature in the hot season. The use of waste tire rubber powder in the composition also has advantages in that it can lower the production cost of the heating-type asphalt waterproofing membrane composition and, at the same time, reduce the environmental cost incurred by the disposal of waste tires.

The content of waste tire rubber powder in the heating-type asphalt waterproofing membrane composition according to the present invention is preferably 5~20 wt %. If the content of waste tire rubber powder is less than 5 wt %, it will lead to an insignificant increase in the softening point and elasticity of the composition, making it difficult to achieve the desired objects, and if it exceeds 20 wt %, it will significantly reduce the interfacial adhesion between asphalt and the rubber powder, so that the rubber powder will agglomerate to reduce its uniformity in the composition, thus reducing the softening point and elasticity of the composition. Also, the particle size of the waste tire rubber powder is preferably 30~40 meshes for uniform mixing with the composition.

The heating-type asphalt waterproofing membrane composition according to the present invention preferably contains 10~50 wt % of an inorganic filler in order to increase the softening point and strength thereof. Examples of this inorganic filler include talc, silica, dolomite, magnesium hydroxide, stone powder, and steel mill slag, which can be used alone or in combination with each other.

Among the inorganic fillers, talc, calcium carbonate or silica is preferably used alone. According to the intended use of the composition, at least two selected from among talc, calcium carbonate and silica may also be used in combination with each other. Although the particle size of talc, calcium carbonate or silica is advantageously as small as possible, it is preferably in the range of 20~2,000 meshes.

In addition, the heating-type asphalt waterproofing membrane composition according to the present invention may further contain an antioxidant and a photostabilizer (UV absorber or HALS stabilizer) in order to prevent a reduction in the physical properties thereof. The content of each of these additives in the composition is preferably 0.5~5 wt %.

When the content of each of the additives is less than 0.5 wt %, it can be found through repeated experiments that, when continuously exposed to heating and UV light, the physical properties of the resulting waterproofing material will change, and cracks will occur on the surface of the waterproofing material. If the content exceeds 5 wt %, it will increase the cost of the waterproofing material and thus reduce the competitive price of the material, because these additives have high prices.

The heating-type asphalt waterproofing membrane composition according to the present invention can be prepared without limitation as to the kind of mixer, such as an impeller mixer or a high-shear mixer, and the order of mixing of the components thereof. It is preferable to use a high-shear or high-viscosity mixer in order to more uniformly disperse the components of the composition and mix the components with each other for a shorter time.

According to the present invention, the paraffinic viscoelastic synthetic oil is first added to asphalt, and the mixture is stirred at 150~180° C. At this time, small amounts of various additives may be selectively added. The reason why the mixing of asphalt with the paraffinic viscoelastic synthetic oil is carried out first is that it provides the effect of plasticizing the asphalt to give low-temperature flexibility to the asphalt and reduce the viscosity of the asphalt.

Then, the waste tire rubber powder, the styrenic block copolymer, the inorganic filler and other additives are added to said mixture and uniformly stirred at a temperature of 150~200° C., thus preparing the heating-type asphalt waterproofing membrane composition according to the present invention.

Also, in the present invention, the heating-type asphalt waterproofing membrane composition is preferably paved to a thickness of 2~4 mm. If the pavement thickness of the waterproofing composition is less than 2 mm, the resulting waterproof layer cannot accommodate the behavior of a bridge deck when the temperature changes, and is also unable to bridge fine cracks of the deck. If it exceeds 4 mm, the waterproof layer between the bridge deck and the pavement layer is thickened, so that the waterproof layer and the pavement layer will be separated from each other by shear stress occurring in the pavement layer.

As described above, the application method according to the present invention effectively achieves integration between the waterproof layer and the pavement layer using sawdust, and provides the excellent measurement values of, for example, tensile adhesion strength and shear adhesion strength.

Also, the inventive application method has advantages in that it can lower the production cost of the waterproofing material and reduce the environmental cost by recycling sawdust. When the heating-type asphalt waterproofing membrane composition is used as a waterproofing material for the base of bridge decks, it will have excellent heat resistance, elasticity, adhesion, low-temperature flexibility and temperature sensitivity, and thus prevent the breakdown of the structures of buildings and bridge decks and contribute to an increase in the life span of the structures. Also, it can contribute to environmental protection by providing technology for obtaining the waterproofing material having excellent physical properties using recycled waste tire rubber powder.

Mode for the Invention

Hereinafter, the present invention will be described in further detail with reference to examples. It is to be understood, however, that these examples are not to be construed to limit the scope of the present invention.

PREPARATION EXAMPLE 1

A pour point depressant (manufactured by Ultra Chemtech Korea Co., Ltd.; a condensation product of chlorinated paraffin and phenol; Cas No. N/A) and a viscosity index improver (manufactured by Ultra Chemtech Korea Co., Ltd.; an olefin copolymer; Cas No. N/A) were nixed with each other at a weight ratio of 1:1.25% of the mixture was mixed with 40 wt % of hydrotreated lube base oil-I (S-3300; manufactured by Ultra Chemtech Korea Co., Ltd.; Cas No. 64741-88-44) and 35 wt % of hydrotreated lube base oil-I (S-9500; manufactured by Ultra Chemtech Korea Co., Ltd.; Cas No. 64742-65-0), thus preparing paraffinic viscoelastic synthetic oil. The paraffinic viscoelastic synthetic oil had a pour point of −60° C., a viscosity index of 200 cp at 25° C., and a flash point of 265° C.

PREPARATION EXAMPLE 2

10 wt % of the paraffinic viscoelastic synthetic oil obtained in Example 1 was added to 55 wt % of Superphalt (SK oil Co., Ltd., Korea) as asphalt having a penetration of about 70 dmm, and the mixture was stirred at about 150~180° C. for about 30 minutes. To the stirred mixture, 10 wt % of a styrenic block copolymer, 10 wt % of waste tire rubber powder, 10 wt % of an inorganic filler and 5 wt % of a stabilizer and an antioxidant were added, and the resulting mixture was uniformly stirred at 180° C. and about 600 rpm for 3 hours, thus obtaining a heating-type asphalt waterproofing membrane composition.

EXAMPLE 1

Foreign matter was removed from a base 1, and then a base coating (primer) was applied on the base 1 in an amount of 0.2 liters per m$^2$ and cured to obtain a smooth surface, thus depositing a base coating layer 2. On the base coating layer 2, the heating-type asphalt waterproofing membrane composition was uniformly applied to a thickness of 2 mm, and was indirectly heated to 200° C., thus obtaining a membrane layer 3.

Before the membrane layer 3 was completely cured, sawdust obtained by either grinding waste wood generated in building and construction fields to a size of 10~20 mm$^2$ or collecting sawdust generated in wood processing factories, sieving the collected sawdust through a 10-mm size sieve and recovering the sawdust portion remaining on the sieve was paved on the membrane layer 3 to a thickness of 2 mm in order to protect the waterproofing layer 3 and to integrate the layer 3 with a pavement layer, thereby obtaining a sawdust layer 4.

On the sawdust layer 4, a top coating (primer tack coating) was paved in an amount of 0.2 liters per m$^2$ and cured in order to increase the adhesion between ascon and the protective layer (sawdust layer), thus depositing a top coating layer 5 on the sawdust layer 4. Then, the top coating layer 5 was paved with ascon at 130° C., thus forming an asphalt pavement layer 6.

COMPARATIVE EXAMPLE 1

This Example was carried out according to a bridge deck waterproofing membrane specification provided by the Korea Highway Corporation.

COMPARATIVE EXAMPLE 2

This Example was carried out according to a bridge deck waterproofing membrane specification provided by the Korea High Speed Rail Construction Authority.

COMPARATIVE EXAMPLE 3

This Example was carried out using heating-type asphalt waterproofing membrane standards provided by the Canadian Standards Association.

COMPARATIVE EXAMPLE 4

According to the prior art, a waterproofing membrane material containing 64% asphalt, 11% SBS thermoplastic rubber, 8% additive and 8% filler was prepared. Herein, the additive was process oil, and the filler was calcium carbonate.

The waterproofing material was heated, melted and uniformly applied on a dried and cleaned base to be waterproofed, thus forming a membrane. Before the membrane was cured, a nonwoven fabric sheet applied with a membrane having the same components as those of said formed membrane was adhered on the underlying membrane under pressure.

The membranes according to Preparation Example 2, Example 1 and Comparative Examples 1~4 were measured, and the measurement results are shown in Tables 1 to 5 below.

TABLE 1

| Test Items | | | Unit | Comp. Example 1 | Comp. Example 2 | Prep. Example 2 |
|---|---|---|---|---|---|---|
| Thickness [20° C.] | | | mm | greater than 2.0 | greater than 2.5 | 3 |
| Tensile Performance | Tensile strength [20° C.] | | kgf/cm² | greater than 15 | greater than 35 | 40 |
| | Elongation [20° C.] | | % | greater than 30 | greater than 80 | 1100 |
| Flexibility (10 mm bar) [−20° C.] | | | | not abnormal | | not abnormal |
| Air permeability | | | g/m²/24 h | | not greater than 6.6 | 4.2 |
| Tensile performance after aging [150° C.] [20° C.] | heating | change in appearance | | not abnormal | not abnormal | not abnormal |
| | | change in mass | % | not greater than 2 | not greater not than 2 | −0.5 |
| | | tensile strength ratio | | greater than 80, but not greater than 15 | greater than 80, but not greater than 15 | 84 |
| | | elongation change | | greater than 80, but not greater than 15 | greater than 80, but not greater than 15 | 97 |
| | alkali | change in appearance | | not abnormal | not abnormal | not abnormal |
| | | change in mass | % | not greater than 2 | not greater than 2 | 0 |
| | | tensile strength ratio | | greater than 80, but not greater than 15 | greater than 80, but not greater than 15 | 94 |
| | | elongation change | | greater than 80, but not, greater than 15 | greater than 80, but not greater than 15 | 100 |
| | acid | change in appearance | | not abnormal | not abnormal | not abnormal |
| | | change in mass | % | not greater than 2 | not greater than 2 | 0 |
| | | tensile strength ratio | | greater than 80, but not greater than 15 | greater than 80, but not greater than 15 | 99 |
| | | elongation change | | greater than 80, but not greater than 15 | greater than 80, but not greater than 15 | 92 |
| | brine | change in appearance | | not abnormal | not abnormal | not abnormal |
| | | change in mass | % | not greater than 2 | not greater 2 | 0 |
| | | tensile strength ratio | | greater than 80, but not greater than 15 | greater than 80, but not greater than 15 | 97 |
| | | elongation change | | greater than 80, but not greater than | greater than 80, but not greater than | 101 |
| Heat-resistant dimensional stability [150° C.] | | | | | not greater than 2 | 1 |
| Change in length [180° C., 30 min] | | | % | | −4 to greater than −1, but not greater than 1 | 0 |
| Fatigue resistance [−20° C.] | | | | not abnormal | not abnormal | not abnormal |
| Tear strength | | | kgf | greater than 5 | | 10 |
| Non-percolation | | | bar | | 10 | 10 |
| Waterproofing | | | | not greater than 0.5 ml | not greater than 0.5 ml | 0.2 |

1) Tensile performance and tear strength: KS F 4917
2) Flexibility: KS M 5000
3) Tensile performance after aging: KS F 4917
4) Fatigue resistance (crack bridging): ASTM D 836
5) Heat resistance, dimensional stability and waterproofing ability: KS F 4932
6) Air permeability: ASTM E 96
7) Non-percolation: specification provided by the Korea High Speed Rail Construction Authority

TABLE 2

| Test items | | Unit | Comparative Example 1 | Comparative Example 2 | Example 1 |
|---|---|---|---|---|---|
| Pitting resistance [20° C.] | | | must have no hole | must have no hole | not abnormal |
| Impact resistance | 10° C. | | pass | pass | pass |
| | 25° C. | | | | |
| | 40° C. | | | | |
| Tensile adhesion | Strength −10° C. | kgf/cm² | more than 12 | | 19 |
| | −25° C. | | | more than 10.0 | 22 |
| | 20° C. | | more than 6 | more than 7.0 | 8.8 |
| | 40° C. | | | more than 3.0 | 4.5 |
| Shear adhesion | Strength −10° C. | kgf/cm² | more than 8 | more than 8 | 12 |
| | 20° C. | | | more than 1.5 | 3.2 |
| | Elongation −10° C. | % | | more than 0.5 | 1.5 |
| | 20° C. | | | more than 1.0 | 3.5 |
| Tensile adhesion strength after water immersion | | kgf/cm² | 70% before water immersion | | 8.2 |

1) Pitting resistance, impact resistance, tensile adhesion, shear adhesion, and tensile adhesion strength after 7 days of water immersion: KS F 4932

TABLE 3

| Test items | | Unit | Comp. Example 3[CAN/CGSB-37.50-M89] | Prep. Example 2 |
|---|---|---|---|---|
| Flash point | | ° C. | 260 ± 25 | 250 |
| Cone penetration | 25° C. | dmm | less than 110 | 65 |
| | 50° C. | | less than 200 | 120 |
| Flow | | mm | 0.3 | 0 |
| Tensile strength | | J | more than 5.5 | 6.0 |
| Tensile strength ratio at break | | | more than 0.040 | 0.06 |
| Adhesion at break | | | not abnormal | not abnormal |
| Non-percolation | | ng/Pa · s · m² | less than 1.7 | 0.5 |
| Waterproofing | | g | −0.18, +0.35 | −0.1, +0.1 |
| Pinholes | | | less than 1 | 0 |
| Low-temperature flexibility [−25° C.] | | | No Cracking | Not abnormal |
| Crack bridging [−26° C.] | | | No racking, splitting, loss adhesion | Not abnormal |
| Thermal stability | | | Not normal | Not abnormal |
| Viscosity | | s | 2~15 | 3 |

\* Measurement method
1) Cone penetration, thermal stability, and flow: ASTM D 5329
2) Tensile strength, tensile strength ratio at break, adhesion at break, non-percolation, waterproofing, pinhole, low-temperature flexibility, crack bridging, thermal stability, and viscosity: CAN/CGSB-37.50-M89.

TABLE 4

| Test items | Prep. Example 2 | Comp. Example 4 |
|---|---|---|
| Cone penetration (25° C., dmm) | 35 | 65 |
| Flow (mm) | 0 | 2 |
| Crack bridging (−15° C.) | Pass | Pass |
| Crack bridging (−20° C.) | Pass | Fail |
| Crack bridging (−26° C.) | Pass | Fail |
| Waterproofing | Pass | Pass |
| Softening point (° C.) | 115 | 96 |

TABLE 5

| Test items | Example 1 | Comp. Example 4 |
|---|---|---|
| Tensile adhesion strength (−10° C., kgf/cm²) | 19 | 8 |
| Tensile adhesion strength (20° C., kgf/cm²) | 8.8 | 3 |
| Tensile adhesion strength (−10° C., kgf/cm²) | 12 | 3.6 |
| Tensile adhesion strength (−20° C., kgf/cm²) | 3.2 | 0.6 |

\* Measurement method
Cone penetration, flow, and softening point: ASTM D 5329
Waterproofing: KS F 4932
Crack bridging: ASTM D 836
Tensile adhesion strength and shear adhesion strength: KS F 4932

As can be seen in Tables above, the waterproofing membrane applied according to the present invention showed excellent result values that were higher than all standard values required by the Korea Highway Corporation, the Korea High Speed Rail Construction Authority, and the Canadian Standards Association, and also showed excellent results compared to those of the prior art.

INDUSTRIAL APPLICABILITY

As described above, a waterproofing membrane applied according to the inventive application method fundamentally has an excellent waterproofing function of preventing the infiltration of water, and shows excellent durability against alkalis and acids, such as snow removers, seawater, acid rain and the like. Also, the waterproofing layer placed between the rigid concrete structure and the soft pavement layer has excellent adhesion to both the concrete structure and the pavement layer, because shear force is applied to the waterproofing layer due to the difference in thermal expansion coefficient between the layers.

Also, the waterproofing membrane layer has excellent ability to bridge cracks caused by shrinkage and expansion due to changes in the temperature of the structure of buildings and bridge decks, and can be prevented from being damaged by pavement equipment and the pavement layer after the construction thereof. In addition, it can contribute to the extension of the life span of buildings and bridge decks due to the complete integration between the waterproofing membrane layer, the pavement layer and the base of buildings and bridge decks.

The invention claimed is:

1. A method of applying an asphalt waterproofing membrane material for buildings and bridge decks, the method comprising the steps of:
    removing foreign matter from a base, paving a base coating on the base to obtain a smooth surface and curing the obtained surface;
    uniformly paving a heating-type asphalt waterproofing membrane composition on the cured surface and indirectly heating the paved composition at a temperature of 180~200° C.;
    applying sawdust on the composition before the composition is cured; and
    paving a top coating (primer tack coating) on the sawdust, curing the paved top coating, and then paving an asphalt or concrete pavement material on the cured top coating.

2. The method of claim 1, wherein heating-type asphalt waterproofing membrane composition is paved to a thickness of 2~4 mm.

3. The method of claim 1, wherein the sawdust is applied to a thickness of 0.5~4 mm.

4. The method of claim 1, wherein the heating-type asphalt waterproofing membrane composition comprises: 20~70 wt % of asphalt; 1~30 wt % of a styrenic block copolymer; 0.5~30 wt % of paraffinic viscoelastic synthetic oil obtained by mixing 70~80 wt % of hydrotreated lube base oil, or a mixture of hydrotreated lube base oils having different properties, with 20~30 wt % of additives consisting of a pour point depressant and a viscosity index improver, the paraffinic viscoelastic synthetic oil having a pour point of −60° C., a viscosity index of 200 cp at 25° C., and a flash point higher than 250° C.; 5~20 wt % of waste tire rubber powder; and 10~50 wt % of an inorganic powder.

5. The method of claim 4, wherein the pour point depressant is one or more selected from the group consisting of a condensation product of chlorinated paraffin and naphthalene, a condensation product of chlorinated paraffin and phenol, polyalkylmethacrylate, a condensation product of phenol and paraffin, and a condensation product of paraffin and phthalic acid.

6. The method of claim 4, wherein the viscosity index improver is one or more selected from the group consisting of poly-iso-butylene, an olefin copolymer, an ethylene-propylene copolymer, a stylene-butadiene copolymer, a stylene-maleic acid-ester copolymer, and poly-methacrylate.

7. The method of claim 4, wherein the asphalt has a softening point of 30~100° C. and a penetration of 30~175 dmm.

8. The method of claim 4, wherein the waste tire rubber powder has a particle size of 30~40 meshes.

9. The method of claim 4, wherein the inorganic filler is one or more selected from the group consisting of talc, silica, dolomite, magnesium hydroxide, stone powder, and steel mill slag.

* * * * *